Aug. 8, 1961 R. S. C. COBBOLD 2,995,733

MAGNETIC CORE MEMORY

Filed Jan. 26, 1959 3 Sheets-Sheet 1

INVENTOR
RICHARD S. C. COBBOLD
BY Smart & Biggar
ATTORNEYS.

INVENTOR
RICHARD S.C. COBBOLD
BY– Smart & Biggar.
ATTORNEYS

Aug. 8, 1961 R. S. C. COBBOLD 2,995,733
MAGNETIC CORE MEMORY
Filed Jan. 26, 1959 3 Sheets-Sheet 3

INVENTOR
RICHARD S.C. COBBOLD
BY Smart & Biggar.
ATTORNEYS.

United States Patent Office 2,995,733
Patented Aug. 8, 1961

2,995,733
MAGNETIC CORE MEMORY

Richard S. C. Cobbold, Ottawa, Ontario, Canada, assignor to Her Majesty the Queen in Right of Canada, as represented by the Minister of National Defence Filed Jan. 26, 1959, Ser. No. 788,995
6 Claims. (Cl. 340—174)

The present invention relates to a coincident current magnetic core memory.

Magnetic core memories are normally used in binary digital computers for the storage of information and instructions used in the computation. This information is stored in binary form in the magnetic core memory, two possible remanent inductions of the magnetic core being indicative of the two binary digits. Each magnetic core in the memory is thus capable of storing one bit, i.e., binary digit, of information. The information is organized into "words" which constitute a discrete number of bits, the whole word being used in a computation.

Binary digital computers may be considered in two types—those in which the word is acted upon bit by bit or serially, and those which act upon the word in parallel. The present invention is restricted to a magnetic core memory suitable for use in a digital computer wherein information is read into and out of the memory in parallel. The reading of information in parallel signifies that all the bits in a word are obtained at the output from the memory at the same instant in time.

Known magnetic core memories are constructed in a plurality of similar planes, each plane consisting of rows and columns of magnetic cores. The number of bits in the computer word is equal to the number of planes in the memory, one bit in each word being stored in each plane. A word location thus consists of a magnetic core from the same location in each plane. In order to obtain information from the known memory it is therefore necessary to interrogate each plane of the memory. The construction and operation of known magnetic core memories has been described in several publications and reference is made here to the article by Rajchman in the 1953 Proceedings of the I.R.E., pages 1408, 1409 and 1410 and the article by Owens in the 1956 Proceedings of the I.R.E., pages 1243, 1244 and 1245. On page 1408 of his article, Rajchman describes the principle of operation of a coincident current magnetic core memory. According to Rajchman the cores of each plane are arranged in rows and columns with a coincident current conductor threading each core in each row and each core in each column. Thus there are two coincident current conductors threading each core. Each coincident current conductor carries one-half the total current required to drive a magnetic core to saturation in a given direction. Thus a core at the intersection of two energized coincident current conductors will receive a sufficient current pulse to saturate the core in a given direction. All other cores threaded by the two conductors will not receive a sufficient pulse to charge their magnetic state. According to Rajchman a single read-out conductor is threaded through every core in the plane and a voltage is induced in this read-out conductor whenever a magnetic core is driven to saturation in a given direction.

As discussed by Owens, on pages 1244 and 1245, each plane of a known magnetic core memory will have its own readout wire and the readout of a word from the computer memory is effected by pulsing the appropriate core in each plane of the memory and utilizing the signal obtained on the read-out wire from each plane. The problems with known memories are mentioned in the third and fourth complete paragraphs of the second column of page 1244. As stated by Owens the departure from rectangularity in the hysteresis loop of the cores causes unwanted output voltages to be generated. Additionally, voltages are induced in the read-out wire by magnetic induction from the coincidence currents.

The present invention provides a magnetic core memory in which the disturbance caused by spurious signals in the magnetic core memory is minimized. The memory constructed in accordance with the invention is simpler to build and considerably easier to maintain.

In accordance with the present invention, a magnetic core memory is provided comprising a plurality of annular ferromagnetic cores arranged in columns and rows, the rows being substantially perpendicular to the columns, and a plurality of coincidence current (drive) wires, read (or readout) wires, and inhibit wires threading the cores. Each core is threaded by two coincidence current wires, a read wire, and an inhibit wire. The coincidence current wires thread the cores by rows, and the inhibit and read wires thread the cores by columns. Which lines of cores are called rows and which columns is, of course, purely arbitrary; the essential feature is that the read wires are substantially parallel to the inhibit wires and are substantially perpendicular to the coincidence current wires. The wires are arranged so that no two cores are threaded by the same two coincidence current wires and read wire, or by the same two coincidence current wires and inhibit wire. If a positive direction is assigned to each wire and the direction in which the wires pass through the cores is considered, then according to the invention the number of cores threaded by any coincidence current wire and any read wire passing through the core in the same direction will be equal to the number of cores threaded by these two wires passing through the core in opposite directions; thus if $n$ cores are threaded by a read wire and a coincidence current wire from the same face of the core, then $n$ cores will be threaded by these wires from opposite faces of the core. And all the cores threaded by any coincidence current wire and any inhibit wire will, according to the invention, be threaded in the same direction by the inhibit wire relative to the direction of the coincidence current wire; in other words, all of such cores will be threaded in the positive direction by both the inhibit wire and the coincidence current wire, or else all of such cores will be threaded in the positive direction by one wire and in the opposite direction by the other wire.

It should be noted that the invention will still operate if the number of cores threaded by a read wire and a coincidence current wire in opposite directions is not exactly equal to the number of cores threaded in the same direction. But optimum results are obtained when the two numbers are equal, and in practice it is easy to construct a core memory in which the numbers are exactly equal.

This configuration of magnetic core memory provides advantages over the known structure in that all conductors are threaded through the core in a rectangular system and no conductors are threaded through the core at angles other than 90 degrees with respect to other conductors. When this structure is incorporated into a computer memory utilizing planes composed of rows and columns of these cores, there is no single conductor threading each core of every plane. Since the read-out conductor is at right angles to the two coincident current conductors no voltage due to magnetic induction of the coincident current impulses is induced in the read-out winding and one of the large sources of unwanted signals in a computer memory is avoided. A memory according to the invention may be constructed by passing the wires through the memory along the rows and columns of cores. The replacement of a single damaged core is made practicable in a memory according to the invention since it is only necessary to remove the two pairs of conductors threading through a given core and that core will drop out of the memory plane. With known memories it has also been necessary to break the read-out wire at the defective core and resolder it on insertion of a new core. Since magnetic core memories are normally constructed in a very compact form with a typical density of 10 cores per inch along the sides of the memory, it will be seen that the breaking and resoldering of the read wire in the centre of a plane of cores is such a difficult procedure that it has proven less expensive to replace a whole memory plane rather than repair a damaged core.

With the memory according to the invention the information is stored in a slightly different manner from known memories. A single word in the computer memory is now stored in a line of cores in a single plane of the memory and access to any word in the memory requires only that one row of cores in one plane receives simultaneously two coincident current impulses.

In drawings which illustrate embodiments of the invention,

Figures 1, 2, 3:
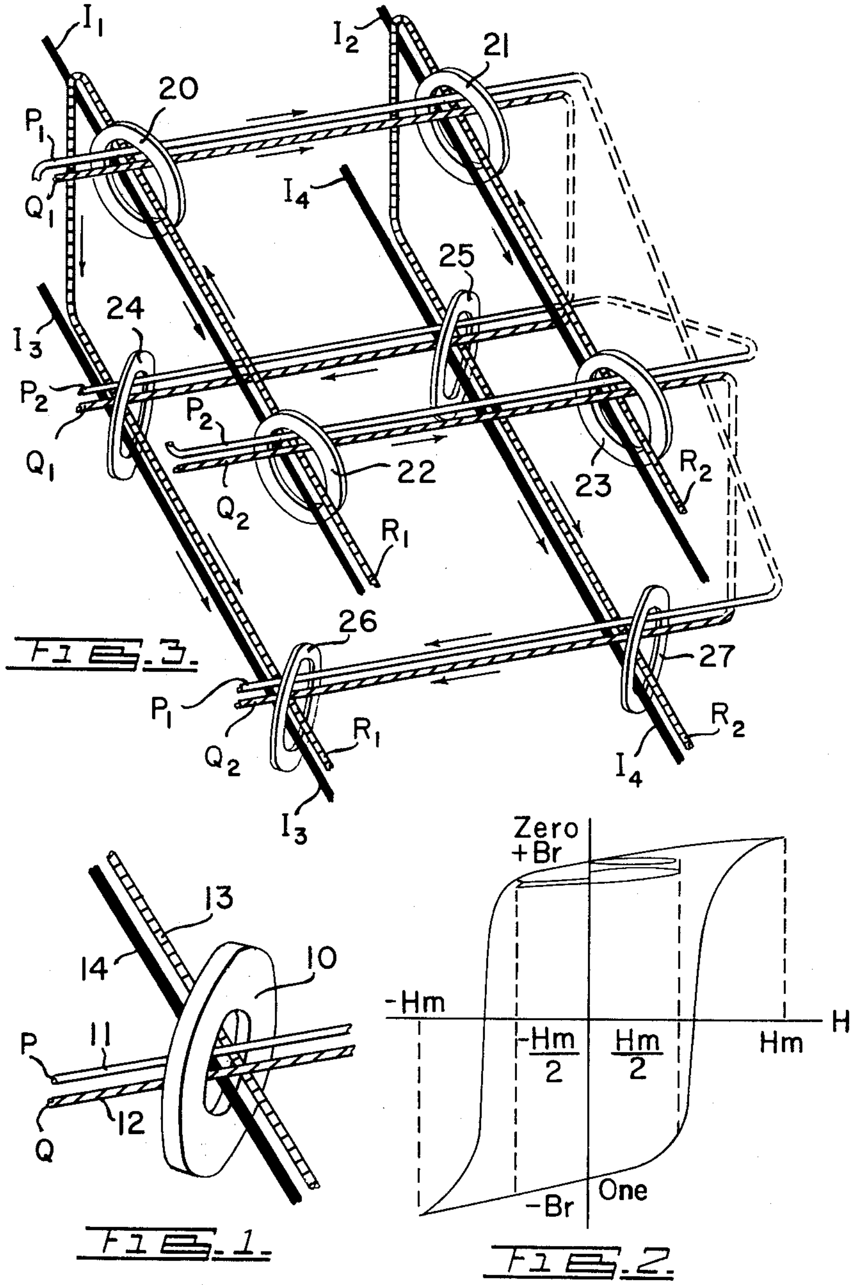
FIGURE 1 is a perspective view of a single core having two pairs of conductors threading therethrough.
FIGURE 2 is an hysteresis loop of a typical magnetic core used in memories constructed in accordance with the invention.
FIGURE 3 is a perspective section of a small portion of two planes in a computer memory according to the invention.

In FIGURE 1 an annular ferromagnetic core 10 is threaded on four conductors 11, 12, 13 and 14. The conductors 11 and 12 are parallel to one another and are at right angles to conductors 13 and 14 which are also parallel to one another. Either pair of conductors could be used to carry the coincident currents to saturate a magnetic core. It will be assumed that conductors 11 and 12 will carry these currents. For purposes of clarity in discussing subsequent figures, the conductor 11 will be referred to as the P winding and conductor 12 will be referred to as the Q winding. The P winding and the Q winding when energized each carry one-half the current necessary to saturate the magnetic core 10. A current impulse on either the P winding or Q winding alone is insufficient to drive the core 10 to saturation. The conductor 13 is used as a read winding in which a voltage is induced when the magnetic core becomes saturated. The conductor 14 is used as an inhibit winding which may be energized to prevent the saturation of the magnetic core when coincident currents are applied to the P and Q windings in order to restore information to the core after it has been read out. It will be appreciated that the read-out of information from a magnetic core destroys the information stored in the core and it is necessary to reset or restore that information into the core if it is to be retained for future use.

FIGURE 2 shows the hysteresis loop of a typical core used in a memory constructed in accordance with the invention. This hysteresis curve is a plot of ampere turns versus flux density and shows that the application of a field having the value $$\frac{H_m}{2}$$

will not cause the saturation of the core to be altered and that the application of a field of $H_m$ will drive the core to saturation in the direction of the application of the force. If a current of $$\frac{I}{2}$$

induces a magnetic force of $$\frac{H_m}{2}$$

and a current of $$\frac{I}{2}$$

is present in both P and Q windings threading a core then all cores threaded by the P and Q windings will have a field of $H_m$ induced and will be driven to saturation. All cores threaded by only one of these windings will remain in the same magnetic state as before the application of the current.

FIGURE 3 is a perspective section of two planes of a magnetic core memory showing four cores in each plane. Two P windings P1 and P2 are shown threading the eight cores. Similarly two Q windings, Q1 and Q2 are shown threading the eight cores. In the upper plane of windings P1 and Q1 are common to the two rear cores 20 and 21 and the windings P2 and Q2 are common to the front two cores 22 and 23. In the lower plane the rear two cores 24 and 25 are threaded by the windings P2 and Q1 and the front two cores 26 and 27 are threaded by the windings P1 and Q2. Thus a current impulse on P1 and Q1 simultaneously would saturate only the rear two cores 20 and 21 of the upper plane and the remaining cores shown would not be saturated. Similarly, simultaneous current impulses on windings P2 and Q2 would cause saturation of the two front cores 22 and 23 in the upper plane only. The read winding R1 is threaded through the left-hand cores 20 and 22 of the upper plane and the left-hand cores 24 and 26 of the lower plane and the read winding R2 is threaded through the right-hand cores 21 and 23, and 25 and 27 of the upper and lower plane. Thus there is a read winding for each core along a row in each plane threaded by a pair of coincident current windings.

Since a word is stored in the memory constructed according to the invention in a row of cores in one plane, it is necessary to provide a read wire for each core in the row in order to read out the word in parallel. It is desirable to minimize the pickup of extraneous signals by wiring the read winding in such a manner that the undesired voltages induced in one plane will be cancelled by the undesired voltages simultaneously generated in an adjacent plane in the memory.

If a coincident current wire and a "read" wire pass through a core from the same face, the resulting voltage induced in the "read" wire will be positive. Passage through a core from opposite faces will give a negative voltage. Thus cores 20, 21, 22 and 23 of FIGURE 3 will give positive voltages and cores 24, 25, 26 and 27, negative voltages. Cancellation of the unwanted voltages between cores lying along the read wire is thus ensured for a coincident current.

If currents I/2 are present on both a P and a Q wire, then cores threaded by these two wires will be subjected to a field of $H_m$, so that if all these cores were previously in a state $-B_r$ (FIGURE 2), then a current of $+I$ will change all these cores to a state $+B_r$.

If currents of $+I/2$ are present in the P, Q and inhibit wires, then cores threaded by these wires will be subject to a net field of $+I/2$ so that no change of state will occur. Information may thus be written in by passing currents of $+I/2$ through P and Q and certain of the inhibit wires. It is thus necessary to pass currents through the P and Q wires to read information out of the memory and to pass currents through the P, Q and inhibit wires to write information into the memory.

Figure 4:
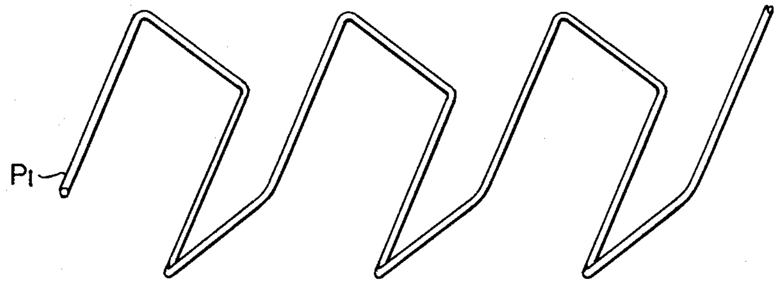
FIGURE 4 is a perspective view of a coincident current winding threading two planes of a memory.
Figure 5:
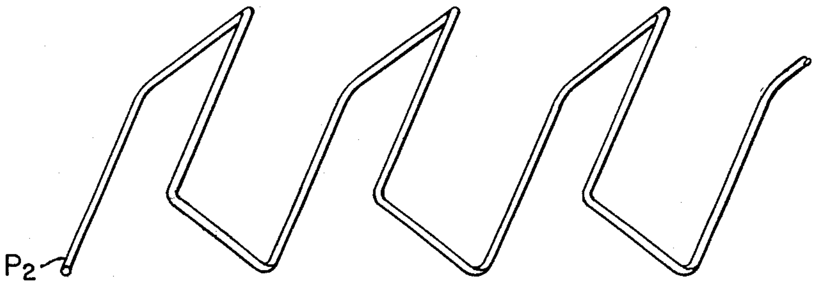
FIGURE 5 is a perspective view of a coincident current winding complementary to the winding illustrated in FIGURE 4.

FIGURES 4, 5, 6, 7 and 8 are perspective phantom views from a common viewing point of the windings in a memory constructed according to the present invention. This memory consists of a plurality of planes of cores arranged in rows and columns. The planes are stacked one over the other with the corresponding rows and columns of each plane in vertical alignment. In FIGURE 4, a winding P1 is shown beginning on the left-hand side and proceeding away from the viewer down a row of cores in the top plane and then crossing diagonally at the rear of the memory to the second plane down and to the next row to the right. The P winding then passes forward through the second row of cores in the second plane to the front of the memory and then diagonally upward to the third row of cores in the first plane. This pattern is repeated across the width of the memory. In FIGURE 5 the winding P2 which is complementary to the winding P1 is shown. The winding P2 begins at the first row of cores in the lower plane and proceeds from front to rear through the row and then diagonally upward to the second row of cores in the upper plane forward through this row and then diagonally downward to the third row of cores in the second plane. The pattern of the $P_2$ winding repeats across the whole width of the memory.

Figure 6:
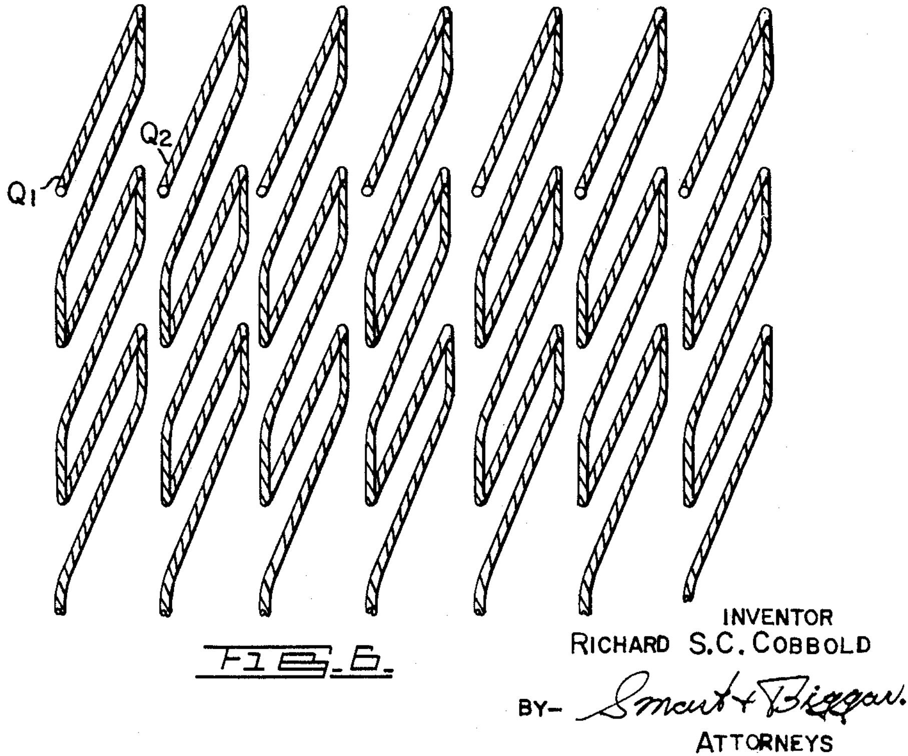
FIGURE 6 is a perspective view of a plurality of coincident current windings threading a plurality of planes.

In FIGURE 6 a plurality of Q windings Q1, Q2 etc. are shown, which windings are threaded vertically through the memory. The winding Q1 begins at the front of the first row in the top plane of the memory and is threaded through the first row together with the winding P1. At the rear of the first row this winding is carried down to the first row of the second plane where it is threaded forward through this first row of the second plane together with the winding P2. This pattern is repeated with the winding Q1 zig-zagging vertically downward through the planes of the memory. Similarly the winding Q2 begins at the second row in the top plane and threads through the second row together with the winding P2 and then downward to the second row of the second plane and forward through the second row of the second plane, and so on to the bottom of the memory.

Figure 7:
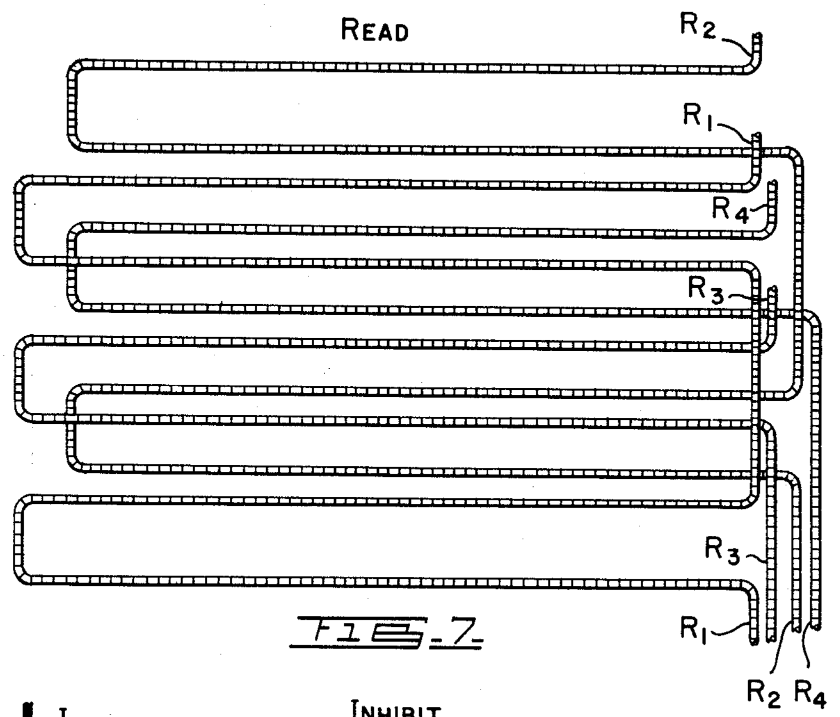
FIGURE 7 is a perspective view of four read windings threading a plurality of planes.

FIGURE 7 shows the read windings for a memory constructed in accordance with the invention. For the sake of clarity only the read windings for the first two columns of each plane are shown. The read windings R1 and R2 lie in a vertical plane at right angles to the planes of the Q windings. The read winding R1 is threaded from right to left along the first column of the top plane of the memory and then downward at the left-hand end and from left to right through the first column of the second plane of the memory. This winding then is carried down to the fifth plane where it proceeds from right to left through the first column of the fifth plane and down at the left-hand end and from left to right through the first column of the sixth plane. Similarly the winding R2 is threaded through the second column of the same planes as the winding R1. The windings R3 and R4 are threaded through the first and second columns respectively of the third and fourth and seventh and eighth planes in a similar fashion to the R1 and R2 windings.

Figure 8:
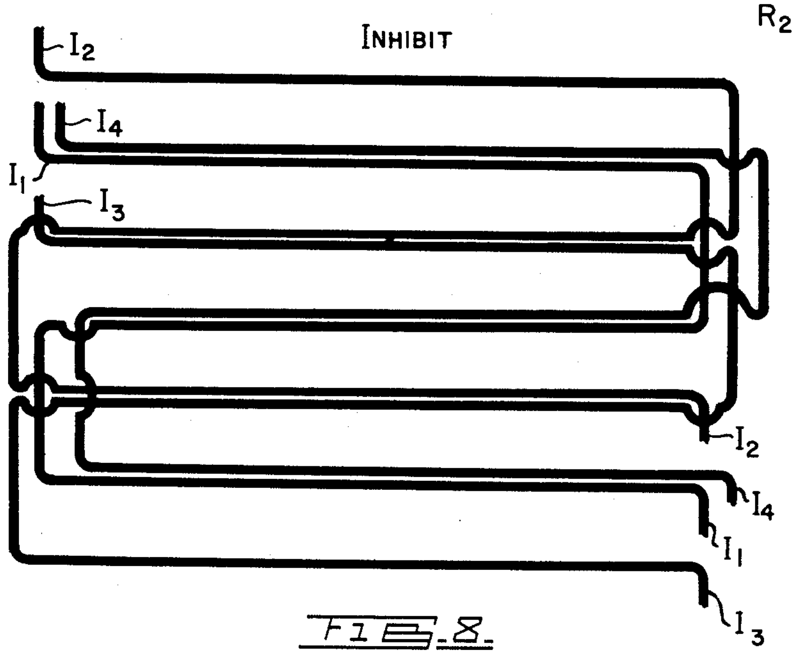
FIGURE 8 is a perspective view of four inhibit windings threading a memory.

FIGURE 8 shows the inhibit windings for the first two columns of each plane for a memory constructed according to the invention. These inhibit windings are threaded through the memory in the same manner as the read windings and are parallel to the read windings. The inhibit winding $I_1$ is threaded from left to right through the first column of the top plane and then downward to the first column of the third plane where it proceeds from right to left and then downward to the first column of the fifth plane where it proceeds from left to right. Similarly the winding $I_2$ is threaded through the second column of the same planes as the winding $I_1$. Windings $I_3$ and $I_4$ are threaded through the first and second columns respectively of the even numbered planes in a manner similar to the windings $I_1$ and $I_2$.

It will be noted that the orientation in each plane, of the cores themselves is important so that proper current cancellation is obtained. In FIGURE 3, the orientation of the axes of the cores in the upper plane is substantially at right angles to the orientation of the axes of the cores in the lower plane. If the orientation of the first plane of cores (uppermost plane in FIG. 3) is A and the orientation of the second plane of cores is B (lower plane in FIG. 3) then each $(4n-3)^{\text{th}}$ and each $4n^{\text{th}}$ plane of cores should be in A orientation, where $n$ is an integer, and the other planes of cores should be in B orientation, if the wiring schemes shown in FIGS. 4 to 8 are to be used. Thus the first, fourth, fifth, eighth, etc. planes of cores have A orientation, the others B orientation. Using the wiring scheme described, all the cores in any plane will have the same orientation, and the orientation sequence from the top plane downwards is ABBAABBAA . . . Of course, there is no reason why the uppermost plane of cores should not be in B orientation, provided a proper wiring scheme is used. The system described with reference to FIGS. 3 to 8 is simply one convenient design for a memory according to the invention. Any other design which enables the P and Q coincidence current windings to thread cores parallel to each other and perpendicular to the read and inhibit windings, which allows each inhibit winding to pass a current in the opposite direction to the current passed by any P or Q winding through all the cores common to the inhibit winding and the P or Q winding, which provides cancellation of spurious currents induced in each read winding by any P or Q winding, which provides a unique combination of P, Q and inhibit windings for each core and also a unique combination of P, Q and read windings for each core, and which preferably permits a convenient and systematic reading and writing operation, should be satisfactory.

The soldered joints connecting memory frames together can be a major source of failure of memory systems. But using the system just described, and wiring two planes together (back to back) the number of soldered joints can be reduced considerably.

For a memory consisting of 32 planes of 16 x 32 cores the number of joints is less than 1200 when constructed according to the invention, while using known construction at least 3072 joints would be required.

During construction of a plane there is quite a high chance of breaking or damaging a core, which might be detected only after completing the frame. Also, in the production of known planes a frequent cause of rejection is the read wire skipping a core. With known memory configurations the extraction of a core or correction of a wiring error necessitates breaking both the inhibit and read wires, which is very undesirable as well as being difficult.

The wiring pattern according to the invention enables a core to be removed by simply unsoldering the read, inhibit, and Q wires, and breaking the P wire at the point where it goes to the other plane (a relatively simple operation). On removing the four wires, the faulty core can be removed, and the new one inserted in its place.

The wiring system proposed is such that it is easily adaptable to semi-automatic production techniques. This is because, unlike most previous systems proposed, it has no common wire threading every core in the plane which causes most of the wiring difficulty.

In magnetic core memory systems, one of the chief causes of noise is the inductive and capacitative pick-up in the read wire from the coincident current wires.

The read wire is normally wound in such a manner that noise tends to cancel out. But in practice this is not achieved, as it requires the exact placement of wires in order to obtain cancellations between the different parts of the winding, and this results in inductive pick-up contributing a significant portion of the read winding noise. Capacitative noise is usually much smaller than the inductive noise, but can become significant if the read/write pulse rise time is fast. In the present invention the read wire is always at right angles to the drive wires, and both the above causes of noise are greatly reduced, as the pick-up is minimized. This allows a simplification in design of the read circuits, because for small memories it reduces the necessity for pulses to discriminate between a "one," and zero plus noise, signals.

What I claim as my invention is:

1. A magnetic core memory comprising a plurality of annular cores of ferromagnetic material arranged in a plurality of spaced planes, a plurality of first coincidence current wires threading a plurality of lines of cores, said lines, in any one plane, being parallel; a plurality of second coincidence current wires threading said plurality of lines of cores, any one first coincidence current wire and any one second coincidence current wire threading only one line of cores together, a plurality of readout wires threading a plurality of lines of cores which are, in any plane, at right angles to the lines of cores in said plane threaded by the coincidence current wires, each core being threaded by a first coincidence current wire and a second coincidence current wire and a readout wire which wires together do not thread any other core in the memory, each readout wire and each coincidence current wire having an arbitrary direction, each readout wire and any coincidence current wire entering a substantially equal number of cores from the same face and from opposite faces, a plurality of inhibit wires threading the lines of cores threaded by the readout wires, each core being threaded by two coincidence current wires and an inhibit wire which wires together do not thread any other core, the same relationship for each core intersected by a common coincidence current wire and a common inhibit wire being maintained between the face entered by the said common coincidence current wire and the face entered by the said common inhibit wire.

2. A magnetic core memory as claimed in claim 1, wherein the said spaced planes of cores are substantially parallel.

3. A magnetic core memory as claimed in claim 2, wherein the cores are arranged in line parallel to an X-axis, a Y-axis, and a Z-axis, the X- and Y-axes being mutually perpendicular and the Z-axis being inclined with respect to the X- and Y-axes.

4. A magnetic core memory as claimed in claim 3, wherein the X, Y, and Z-axes are mutually perpendicular.

5. A magnetic core memory comprising a plurality of annular cores of ferromagnetic material arranged in a plurality of spaced planes in lines substantially parallel to an X axis and a Y axis perpendicular to the X axis, the number of lines of cores parallel to the X axis and the total number of cores being the same for all the planes, each core having an axis passing through its centre and perpendicular to its faces, the X and Y axes defining a coordinate system in which the positive X direction is zero ° and the positive Y direction is 90°, the said axis of each core in any $4n^{th}$ plane and in any $(4n-3)^{th}$ plane lying at an angle between 90° and 180° in the said coordinate system, the axis of each core in any $(4n-2)^{th}$ plane and in any $(4n-1)^{th}$ plane lying at an angle between 0° and 90° in the said coordinate system, a first plurality of first coincidence current wires threading lines of cores parallel to the Y-axis, each of said first plurality of first coincidence current wires threading cores in only two planes, each of said first plurality of first coincidence current wires threading the first and every alternate line of cores thereafter parallel to the Y-axis in the $(2k-1)^{th}$ plane and threading the second and every alternate line of cores thereafter parallel to the Y-axis in the $2k^{th}$ plane, a second plurality of first coincidence current wires threading lines of cores parallel to the Y-axis, each of said second plurality of first coincidence current wires threading cores in only two planes, each of said second plurality of first coincidence current wires threading the second and every alternate line of cores thereafter parallel to the Y-axis in the $(2k-1)^{th}$ plane and threading the first and every alternate line of cores thereafter parallel to the Y-axis in the $2k^{th}$ plane, all the lines of cores threaded by any first coincidence current wire in an one plane being threaded in the same direction by the said any first coincidence current wire, the lines of cores in one plane threaded by the said any first coincidence current wire being threaded in a direction opposite that in which the lines of cores in the other plane are threaded by the said any first coincidence current wire, a plurality of second coincidence current wires, each second coincidence current wire threading only the $m^{th}$ line of cores parallel to the Y-axis in each plane of cores, each line of cores parallel to the Y-axis being threaded by a second coincidence current wire, any second coincidence current wire threading the lines of cores in every $(2k-1)^{th}$ plane of cores in one direction and threading the line of cores in every $2k^{th}$ plane of cores in a direction opposite that in which the said any second coincidence current wire threads the line of cores in the $(2k-1)^{th}$ planes, a first plurality of readout wires, each of said first plurality of readout wires threading only the $p^{th}$ line of cores parallel to the X-axis in all $(4n-3)^{th}$ and $(4n-2)^{th}$ planes of cores, a second plurality of readout wires, each of said second plurality of readout wires threading only the $p^{th}$ line of cores parallel to the X-axis in all the $4n^{th}$ and $(4n-1)^{th}$ planes, all lines of cores parallel to the X-axis being threaded by a readout wire, the line of cores parallel to the X-axis in the $4n^{th}$ plane being threaded by any readout wire in a direction opposite to that in which the line of cores parallel to the X-axis in the $(4n-1)^{th}$ plane is threaded by the said any readout wire, the line of cores parallel to the X-axis in the $(4-3)^{th}$ plane being threaded by any one readout wire in a direction opposite to that in which the line of cores parallel to the X-axis in the $(4n-2)^{th}$ plane is threaded by the said any one readout wire, a first plurality of inhibit wires, each of said first plurality of inhibit wires threading the $p^{th}$ line of cores parallel to the X-axis in every $(2k-1)^{th}$ plane of cores, a second plurality of inhibit wires, each of said second plurality of inhibit wires threading the $p^{th}$ line of cores parallel to the X-axis in every $2k^{th}$ plane of cores, each line of cores parallel to the X axis being threaded by an inhibit wire, the line of cores parallel to the X axis in any $(4n-3)^{th}$ plane being threaded by any inhibit wire in a direction opposite that in which the line of cores in any $(4n-1)^{th}$ plane is threaded by the said any inhibit wire, the line of cores in any $(4n-2)^{th}$ plane being threaded by any one inhibit wire in a direction opposite that in which the line of cores in any $4n^{th}$ plane is threaded by the said any one inhibit wire, where $n$ is any integer greater than zero and $4n$ does not exceed the number of planes of cores,. $k$ is any integer greater than zero and $2k$ does not exceed the number of planes of cores, $m$ is any integer greater than zero which does not exceed the number of lines of cores parallel to the Y axis in any plane, and $p$ is any integer greater than zero which does not exceed the number of lines of cores parallel to the X axis in any plane.

6. A magnetic core memory as claimed in claim 5, wherein the axes of the cores lie at approximately 135° in any $4n^{th}$ plane and any $(4n-3)^{th}$ plane, and the axes of the cores lie at approximately 45° in any $(4n-2)^{th}$ plane and any $(4n-1)^{th}$ plane.

References Cited in the file of this patent

UNITED STATES PATENTS

| | | |
|---|---|---|
| 2,691,155 | Rosenberg | Oct. 5, 1954 |
| 2,691,156 | Saltz | Oct. 5, 1954 |
| 2,800,643 | Mestre | July 23, 1957 |
| 2,802,203 | Stuart-Williams | Aug. 6, 1957 |
| 2,819,456 | Stuart-Williams | Jan. 7, 1958 |
| 2,888,637 | Lipkin | May 26, 1959 |